(12) United States Patent
Angelopoulos et al.

(10) Patent No.: US 9,640,805 B2
(45) Date of Patent: May 2, 2017

(54) COATING PROCESS FOR FUEL CELL COMPONENTS

(75) Inventors: Anastasios Angelopoulos, Cincinnati, OH (US); Scott L. Peters, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1042 days.

(21) Appl. No.: 11/538,824

(22) Filed: Oct. 5, 2006

(65) Prior Publication Data

US 2007/0098908 A1    May 3, 2007

Related U.S. Application Data

(60) Provisional application No. 60/727,316, filed on Oct. 17, 2005.

(51) Int. Cl.
| | |
|---|---|
| *B05D 5/12* | (2006.01) |
| *H01M 8/0228* | (2016.01) |
| *H01M 8/0221* | (2016.01) |
| *H01M 8/0204* | (2016.01) |
| *H01M 8/0215* | (2016.01) |

(52) U.S. Cl.
CPC ....... *H01M 8/0228* (2013.01); *H01M 8/0221* (2013.01); *H01M 8/0204* (2013.01); *H01M 8/0215* (2013.01); *Y02P 20/582* (2015.11)

(58) Field of Classification Search
USPC ............... 427/407.1, 409, 430.1, 115, 435
See application file for complete search history.

(56) References Cited

U.S. PATENT DOCUMENTS

| 5,518,767 A | 5/1996 | Rubner et al. | |
|---|---|---|---|
| 5,866,237 A | 2/1999 | Angelopoulos | |
| 5,935,652 A | 8/1999 | Angelopoulos | |
| 5,981,098 A * | 11/1999 | Vitale | 429/492 |
| 5,997,997 A | 12/1999 | Angelopoulos | |
| 6,025,057 A | 2/2000 | Angelopoulos | |
| 2002/0001744 A1* | 1/2002 | Tsusaka et al. | 429/42 |
| 2002/0013382 A1* | 1/2002 | Furman et al. | 522/90 |
| 2002/0073382 A1* | 6/2002 | Campbell et al. | 716/2 |
| 2003/0003272 A1* | 1/2003 | Laguitton | 428/141 |
| 2003/0157391 A1* | 8/2003 | Coleman et al. | 429/34 |
| 2004/0038808 A1* | 2/2004 | Hampden-Smith et al. | 502/180 |
| 2004/0237833 A1 | 12/2004 | Sepeur et al. | |
| 2004/0247978 A1* | 12/2004 | Shimamune | 429/34 |
| 2005/0019639 A1 | 1/2005 | Nakakubo et al. | |
| 2005/0084742 A1 | 4/2005 | Angelopoulos et al. | |
| 2005/0181264 A1* | 8/2005 | Gu et al. | 429/38 |
| 2006/0062982 A1* | 3/2006 | Hammond Cunningham et al. | 428/220 |

FOREIGN PATENT DOCUMENTS

| DE | 4026978 A1 | 2/1992 |
|---|---|---|
| DE | 102 23 182 A1 | 5/2002 |
| DE | 10158437 A1 | 6/2003 |
| JP | 6267556 A | 9/1994 |
| JP | 8130025 A | 5/1996 |
| JP | 11148029 A | 6/1999 |
| JP | 2000169984 A | 6/2000 |
| JP | 2000173633 A | 6/2000 |
| JP | 2001155742 A | 6/2001 |
| JP | 2002231262 A | 8/2002 |
| JP | 2004223484 A | 8/2004 |
| JP | 2005060516 A | 3/2005 |
| JP | 2005081547 A | 3/2005 |
| JP | 2005120333 A | 5/2005 |
| WO | WO 2004/100287 | 11/2004 |

OTHER PUBLICATIONS

U.S. Appl. No. 11/463,338, filed Aug. 9, 2006, Angelopoulos.
German Office Action dated Mar. 3, 2015 ; Application No. 102006048852.0 ; Applicant: GM Global Technology Operations LLC ; 5 pages.

* cited by examiner

*Primary Examiner* — Austin Murata
(74) *Attorney, Agent, or Firm* — BrooksGroup

(57) ABSTRACT

A process including coating a fuel cell component with an aqueous solution including a polyelectrolyte polymer.

1 Claim, 4 Drawing Sheets

COATING PROCESS FOR FUEL CELL COMPONENTS

CROSS-REFERENCE TO RELATED APPLICATIONS

This application claims the benefit of U.S. Provisional Application No. 60/727,316 filed Oct. 17, 2005.

FIELD OF THE INVENTION

The present invention relates to a process of coating fuel cell components.

BACKGROUND OF THE INVENTION

Angelopoulos et al., U.S. Pat. No. 6,025,057 discloses a solution to a problem of making electronic packages, for example printed circuit boards, in which a key requirement for making the same is the achievement of an appropriate Pd/Sn seed layer catalyst loading. Insufficient Pd catalyst will lead to voids in a copper deposited circuit layer creating open circuits. Too much catalyst can cause both adhesive failure and lateral conduction. Adhesive failure permits electroless plating solution to leak beneath the photoresist and deposit copper between circuit elements causing short circuits. The disclosed solution to the problem involves depositing an organic polyelectrolyte onto an organic substrate, such as a circuit board formed from fiberglass and epoxy. A colloidal palladium-tin seed layer is deposited on top of the organic polyelectrolyte. This is followed by depositing a photoimageable polymer on top of the seed layer, and photolithographically patterning the photoimageable polymer to uncover portions of the seed layer. Electroless deposition of copper is used to deposit copper over the uncovered portions of the seed layer. The organic polyelectrolyte is deposited from an aqueous solution at a pH appropriate for the desired seed catalyst coating. A disclosed example of an organic polyelectrolyte is a copolymer of acrylamide and beta-metacryloxy ethyl trimethyl ammonium methylsulfate. The above polyelectrolyte includes hydrolyzed amide groups and is deposited on the organic substrate in an aqueous solution containing sulfuric acid at a pH below 4. In another embodiment the polyelectrolyte is deposited on the organic substrate in an aqueous solution containing sodium hydroxide at a pH above 10. Another polyelectrolyte disclosed is a cationic polyamide-amine. A neutral aqueous solution is deployed with the polyelectrolyte concentration ranging between 0.2 and 1.2 grams per liter. A seed layer of Pd/Sn colloidal suspension is deposited over the polyelectrolyte.

Angelopoulos et al., U.S. Pat. No. 5,997,997 issued Dec. 7, 1999, discloses a solution to a problem associated with fabricating circuitized structures, such as printed circuit boards, wherein conventional electroless plating methods often suffer from excessive seed deposition. The presence of excessive seed on the circuit board leads to leakage shorts, poor adhesion of the photoresist used to circuitize the circuit board on the seed layer due to uneven surfaces. The excess seed layer can also lead to unwanted metal plating in subsequent processing steps. The disclosed solution includes providing a work piece including a substrate coated with a polymeric dielectric layer. The work piece with the polymeric dielectric layer is then baked in the surrounding ambient atmosphere. Thereafter, the work piece is treated with a polymeric surfactant which is capable of hydrogen bonding to weak acid groups on the surface of the polymeric dielectric. A disclosed polymeric surfactant is a cationic polyelectrolyte, having amide groups, such as cationic polyacrylamide or cationic polyamido-amine. The polymeric surfactant has a molecular weight ranging from $10^5$ to $10^7$. A disclosed polyelectrolyte is available under the trade name "Polytech" from Polytech, Inc.

In a field unrelated to printed circuit boards, the fabrication of fuel cell stacks includes the making of bipolar plates with water management features. Capillary driven instability of liquid films in hydrophobic bipolar plate channels can result in liquid holdup and loss of fuel cell performance. Plasma processing to introduce hydrophilic functional groups on the surface of bipolar plates has been shown to eliminate liquid holdup and improve fuel cell performance. However, such plasma processing techniques are very expensive and time consuming. Hence, alternative processing options are needed. One such option is disclosed in assignee's provisional U.S. Patent Application No. 60/707,705, entitled "Fuel Cell Component With Coating Including Nanoparticles." This approach involves spraying a thin coating of hydrophilic nanoparticles onto the bipolar plate surface. However, Applicants have discovered a number of durability concerns may exist with such a process including: (1) the lack of color reflectivity from the coating suggests coverage by the coating is not coherent, (2) that organic acid and surfactant residues remain with the coating, and (3) the strength of the coating is a result of cohesive rather than adhesive interactions (that is, little or no chemical bonding of the coating to the substrate). The present invention provides alternatives to the prior art.

SUMMARY OF THE INVENTION

One embodiment of the invention may include a coating process for fuel cell components including applying an aqueous solution including a polyelectrolyte polymer on a fuel cell component.

Other embodiments of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

One embodiment of the invention includes a process including applying an aqueous solution including a polyelectrolyte polymer to a fuel cell component. The polyelectrolyte polymer may include cationic functional groups and/or anionic functional groups. Examples of suitable cationic polyelectrolyte polymers include, but are not limited to, the following: copolymers of acrylamide and quaternary ammonium salts; polyamido-amines; polyallylamine hydrochlorides; epoxy based azo polymers; and acrylic acid based azo polymers. Suitable examples of fuel cell components include, but are not limited to bipolar plates, diffusion media and membrane electrode assemblies. A second coating material may be applied to the polyelectrolyte polymer adhered to the fuel cell component. The second coating material may include negative or positive functional groups that are oppositely charged from the functional groups of the polyelectrolyte polymer so that an ionic bond is formed between the functional groups of the polyelectrolyte and the functional group of the second coating material. For example, the polyelectrolyte polymer may include cationic functional groups and the second coating material may include anionic functional groups so that the positive functional group and the negative functional group form an ionic bond to improve the adhesion of the second coating material to the bipolar plate. By way of example, the second coating material may include, but is not be limited to, a hydrophilic or a hydrophobic material. In one embodiment, the second coating material may include nanoparticles. Suitable second coating materials are disclosed in assignee's U.S. Patent Application Ser. No. 60/707,705 entitled "Fuel Cell Component With Coating Including Nanoparticles", the disclosure of which is hereby incorporated by reference. In one embodiment of the invention the second coating material includes a hydrophilic material including negatively charged groups which may form strong ionic bonds with a cationic polymer (polyelectrolyte) coated on the fuel cell component.

Figure 1:
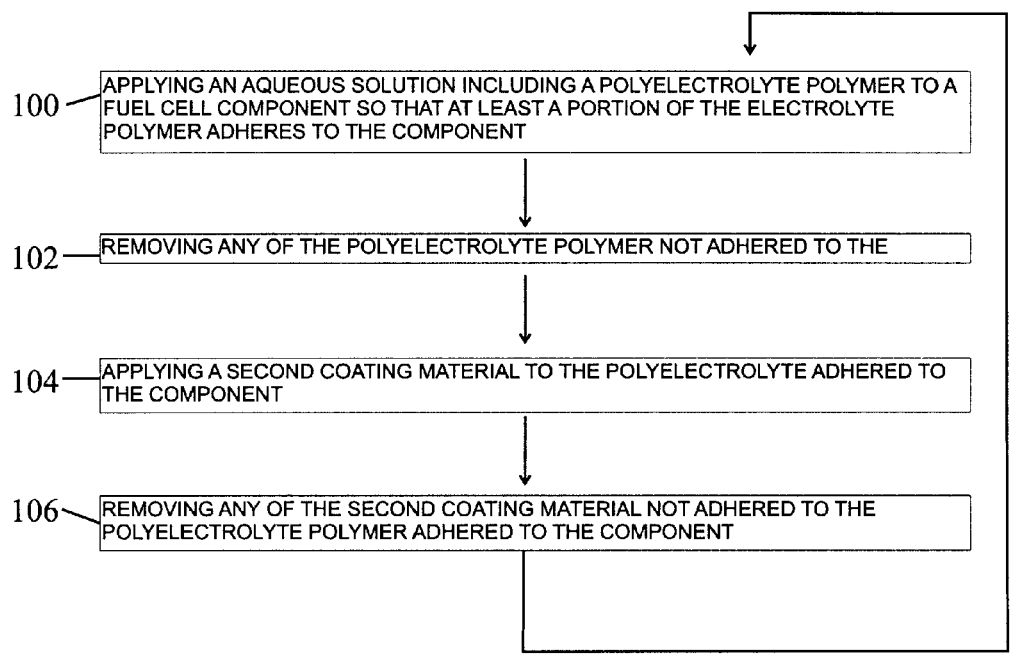
FIG. 1 is a process flowchart illustrating a process according to one embodiment of the invention.

FIG. 1 is a process flow graph illustrating a process according to one embodiment of the invention. In this embodiment, a first step 100 of the process includes applying an aqueous polyelectrolyte polymer solution to a fuel cell component, such as a bipolar plate, so that at least a portion of the polyelectrolyte polymer adheres to the component. A second step 102 of the process includes removing any unadhered polyelectrolyte polymer from the fuel cell component by, for example, rinsing a fuel cell component in deionized water. A third step 104 of the process includes applying a second coating material to the polyelectrolyte polymer adhered to the fuel cell component. The second coating material, may be for example, a material including nanoparticles.

A fourth step 106 of the process includes removing any of the second coating material not adhered to the polyelectrolyte polymer by, for example, rinsing the fuel cell plate in deionized water. Steps 1 through 4 (100-106) may be repeated several times to build up multiple layers of a polyelectrolyte polymer and a second coating material adhered thereto.

Figure 2:
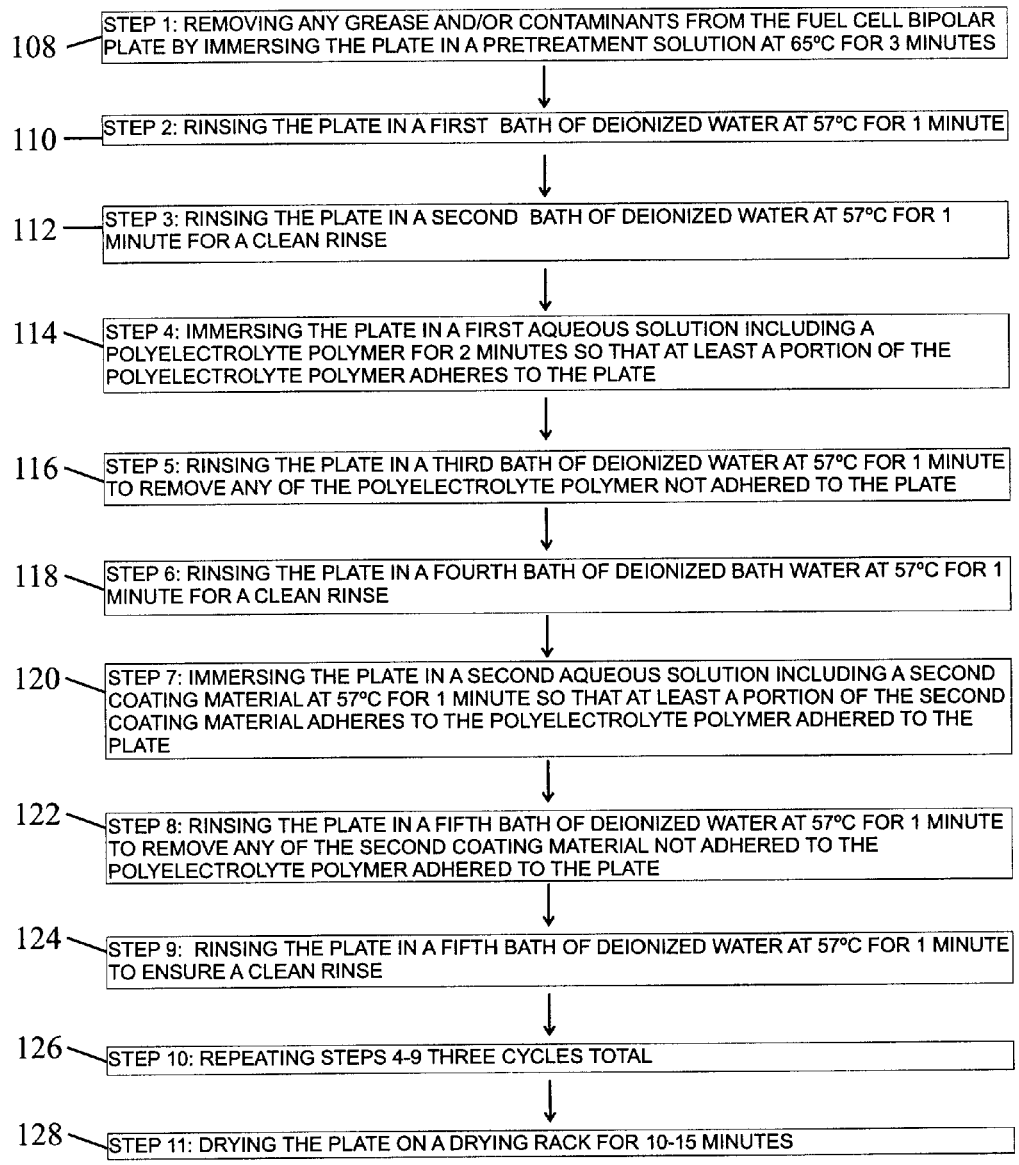
FIG. 2 is a process flowchart illustrating another process according to another embodiment of the invention.

FIG. 2 is a process flow diagram illustrating a process according to another embodiment of the invention. A first step 108 of this process includes removing grease and/or contaminants from a fuel cell bipolar plate by immersing the plate in a pretreatment solution, for example at 65° C. for three minutes. In one embodiment the pretreatment solution includes K2-grade (FDA microelectronics grade) degreaser. A second step 110 of the process includes rinsing the plate in a first bath of deionized water, for example at 57° C. for one minute. A third step 112 of the process includes rinsing the plate in a second bath of deionized water, for example at 57° C. for one minute to perform a clean rinse. A fourth step 114 of the process includes immersing the plate in a first aqueous solution including a first polyelectrolyte polymer, for example for about two minutes so that at least a portion of the polyelectrolyte adheres to the plate. In one embodiment of the invention the first polyelectrolyte polymer is a cationic polyacrylamie, for example Superfloc C-442 or C-446 available from CYTEC. Another example of a cationic polyacrylamide polymer is Polytech 7M available from Polytech, Inc. A fifth step 116 of the process includes rinsing the plate in a third bath of deionized water, for example at 57° C. for one minute, to remove any unadhered first polyelectrolyte polymer. A sixth step 118 of the process includes rinsing the plate in a fourth bath of deionized water, for example at 57° C. for one minute, to perform a clean rinse. A seventh step 120 of the process includes immersing the plate in a second aqueous solution including a second coating material, for example at 57° C. for three minutes. The second coating material may include hydrophilic nanoparticles, such as, X-Tec 4014 or 3408 available from Nano-X. An eighth step 122 of the process includes rinsing the plate in a fifth bath of deionized water, for example at 57° C. for one minute, to remove any unadhered second coating material not adhered to the first polyelectrolyte polymer. A ninth step 124 of the process includes rinsing the plate in a sixth bath of deionized water, for example at 57° C. for one minute, to perform a clean rinse. A tenth step 126 of the process includes repeating steps 4 through 9 (114-124) for three cycles total to build multiple layers of polyelectrolyte polymer and the second coating material thereon. Thereafter, an eleventh step 128 of the process includes drying the plate, for example, by placing the plate on a drying rack for 10-15 minutes.

Examples of suitable second coating materials including nanoparticles are disclosed in assignee's copending U.S. patent Application Ser. No. 60/707,705, and examples of such second coating materials are described hereafter. One embodiment of the invention includes a fuel cell component having a substrate, such as, but not limited to, a bipolar plate having a polyelectrolyte polymer thereon and a second coating material including nanoparticles on the polyelectrolyte polymer. The nanoparticles may have a size ranging from about 2 to about 100 nanometers; preferably, about 2 to about 20 nanometers; and most preferably about 2 to about 5 nanometers. The nanoparticles may be include inorganic and/or organic materials. The second coating material may include a compound including hydroxyl, halide, carboxyl, ketonic and/or aldehyde functional groups. The second coating material may make the fuel cell component, such as a bipolar plate, hydrophilic.

One embodiment of the invention includes a fuel cell component having a polyelectrolyte polymer thereon and a permanent hydrophilic coating comprising nanoparticles having hydrophilic side chains on the polyelectrolyte polymer.

One embodiment of the invention, the permanent hydrophilic coating comprising nanoparticles comprising 10 to 90 weight percent inorganic structures, 5 to 70 weigh percent hydrophilic side chains, and 0 to 50 weight percent organic side chains having at least one functional group. In one embodiment of the invention the hydrophilic side chains that are amino, sulfonate, sulfate, sulfite, sulfonamide, sulfoxide, carboxylate, polyol, polyether, phosphate, or phosphonate groups.

In one embodiment of the invention the second coating material may include organic side chains and wherein the functional groups of the organic side chains may include an epoxy, acryloxy, methacryloxy, glycidyloxy, allyl, vinyl, carboxyl, mercapto, hydroxyl, amide or amino, isocyano, hydroxy, or silanol group. In one embodiment of the invention the coating has pH ranging from 3 and 10.

Another embodiment of the invention includes depositing a slurry solution on a polyelectrolyte polymer on a fuel cell component. The slurry solution including nanoparticles and a vehicle, and thereafter driving off the vehicle. The vehicle may include water, alcohol, and/or other suitable solvents.

In one embodiment the slurry includes 4-5 weight percent nanoparticles with the remaining portion being the vehicle. In one embodiment the vehicle may be driven off at a temperature ranging from about 80 to about 180° C. The curing period may range from 10 minutes at 80° C. to 10 seconds at 180° C.

Suitable slurry materials are available from Nano-X GmbH under the tradenames HP 3408 and HP 4014. The slurry materials may provide permanent hydrophilic coatings capable of surviving fuel cell operating condition for more than 2500 hours. The permanent coating may be formed on metals, such as aluminum and high-grade stainless steel, polymeric substrates, and electrically conductive composite substrates, such as bipolar plates.

US patent application number 2004/0237833, the disclosure of which is hereby incorporated by reference, describes a number of ways to make a slurry useful in the present invention which are duplicated hereafter.

EXAMPLE 1

221.29 g (1 mol) 3-aminopropyl triethoxy silane are added to 444.57 g sulfosuccinic acid, while stirring, and heated to 120° C. in a silicone bath for 5 hours. After the reaction mixture has cooled, 20 g of the viscous fluid are mixed with 80 g (0.38 mol) tetraethoxy silane, and absorbed in 100 g ethyl alcohol. The solution is then mixed with 13.68 g (0.76 mol) of a 0.1 N HCl solution, and tempered in a water bath overnight, at 40° C. This results in hydrophilic nanoparticles having reactive end groups of approximately 2 nm. The resulting solution is diluted with a mixture of ⅓ water and ⅔ N-methyl pyrrolidone (NMP), to a solid substance content of 5%, and applied to a glass plate by spraying, in a wet film thickness of 10 to 20 μm. Subsequently, the substrate is compacted in a circulating air drying cabinet for 3 hours, at 150° C.

EXAMPLE 2

221.29 g (1 mol) 3-aminopropyl triethoxy silane are added to 444.57 g sulfosuccinic acid, while stirring. Then the solution is heated to 130° C., in a silicone bath. After a reaction time of 1 hour, 332.93 g of an alkaline-stabilized aqueous silica gel solution of the Levasil 300/30% type (pH=10) are added to the reaction solution, while stirring. After a reaction time of 12 hours, the mixture is diluted with water, to a solid substance content of 5%. This results in hydrophilic nanoparticles having reactive end groups of approximately 15 nm. The system is applied to plasma-activated polycarbonate sheets by means of inundation, and subsequently dried in a circulating air drying cabinet for 5 hours, at 130° C.

EXAMPLE 3

123.68 g (0.5 mol) 3-isocyanatopropyl triethoxy silane are added to 600 g (1 mol) polyethylene glycol 600, and heated to 130° C., in a silicone bath, after adding 0.12 g dibutyl tin laurate (0.1 wt.-% with regard to 3-isocyanatopropyl triethoxy silane). 25 g (0.12 mol) tetraethoxy silane and 33.4 g (0.12 mol) 3-glycidyloxy propyl triethoxy silane are added to 50 g of the resulting solution (solution A), while stirring. After adding 15.12 g (0.84 mol) of a 0.1 N HCl solution, the mixture is hydrolyzed and condensed at room temperature for 24 hours. This results in hydrophilic nanoparticles having reactive end groups of approximately 5 nm.

EXAMPLE 4

12.5 g (0.05 mol) 3-methacryloxy propyl trimethyloxy silane, 12.5 g of a 20% aqueous $CeO_2$ solution (from Aldrich), and 50 g ethyl alcohol are added to 50 g of the solution A described in Exemplary Embodiment 3, while stirring, in order to homogenize the mixture, and hydrophilization takes place for 48 hours. After adding 0.375 g Ingacure 184 from Ciba Spezialitaten Chemie (3 wt.-% with reference to 3-methacryloxy propyl trimethoxy silane), the mixture is applied to a flamed polycarbonate sheet by means of spraying, in a wet film thickness of at most 30 μm, and first dried thermally in a circulating air drying cabinet at 130° C., for 10 min. This is followed by photochemical drying with Hg emitters having a radiation output of 1-2 $J/cm^2$.

The scope of the invention is not limited to the above describe second coating materials and methods of making the same, but includes other second coating materials including nanoparticles formed on the polyelectrolyte polymer on the fuel cell component. The following is a describe of additional embodiments of second coating materials and methods of making the same.

For example, but not limited to, suitable nanoparticles include $SiO_2$, other metal oxides, such as $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, and derivatives thereof including carbon chains or including carbon, or mixtures thereof.

In one embodiment the second coating material is hydrophilic and includes at least one Si—O group, at least one polar group and at least one group including a saturated or unsaturated carbon chain. In one embodiment of the invention the polar group may include a hydroxyl, halide, carboxyl, ketonic or aldehyde functional group. In one embodiment of the invention the carbon chain may be saturated or unsaturated and may have between 1 to 4 carbon atoms.

The second coating material may have addition elements or compounds, including, for example, Au, Ag, Ru, Rh, Pd, Re, Os, Ir, Pt, rare earth metals, alloys thereof, polymeric carbon or graphite to improve conductivity.

In one embodiment of the invention the second coating material includes a Si—O group and an Si—R group wherein R includes a saturated or unsaturated carbon chain, and wherein the molar ratio of Si—R groups to Si—O groups ranges from ⅛ to ½, preferably ¼ to ½. In another embodiment of the invention the second coating material further includes hydroxyl groups to improve the hydrophilicity of the coating.

Another embodiment of the invention includes a fuel cell component having a component with a polyelectrolyte polymer thereon and a second coating material on the polyelectrolyte polymer, and wherein the coating is derived from a siloxane. The siloxane may be linear, branched or cyclic. In one embodiment the siloxane has the formula $R_2SiO$ and wherein R is an alkyl group.

In another embodiment of the invention, the second coating material is derived from a material having the formula

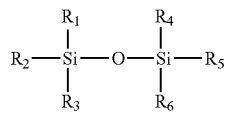

wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different.

In another embodiment of the invention, the second coating material is derived from a material having the formula:

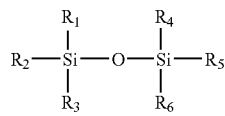

wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different, and at least one of $R_1$, $R_2$, $R_3$, $R_4$, $R_5$, or $R_6$ is a carbon chain with at least one carbon atom.

Another embodiment of the invention includes a fuel cell component having a polyelectrolyte polymer thereon and a second coating material on the polyelectrolyte polymer, wherein the second coating material includes nanoparticles having a size ranging from 1 to 100 nm, preferably 1-50 nm, and most preferably 1-10 nm, and wherein the nanoparticles comprises a compound comprising silicon, a saturated or unsaturated carbon chain and a polar group. In one embodiment the coating may have a mean thickness of 80-100 nm.

Figure 3:
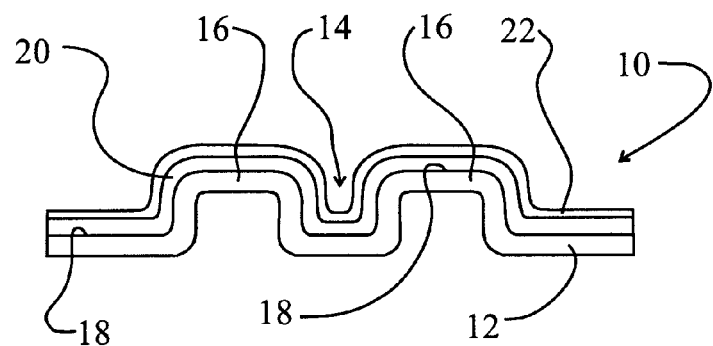
FIG. 3 illustrates a fuel component having a first layer of a polyelectrolyte polymer and a second coating material thereon according to one embodiment of the invention.

As shown in FIG. 3, the fuel cell component may be a bipolar plate which includes a relatively thin substrate 12 that has be stamped to define a gas flow field defined by a plurality of lands 16 and channels 14 (through which the gases flow). The aqueous solution including a polyelectrolyte polymer may be deposited over an upper surface 18 of the bipolar plate so that at least a portion of the polyelectrolyte polymer adheres to the substrate 12 to form a first layer 20. The aqueous solution including a polyelectrolyte polymer may be deposited over the upper surface 18 before or after the substrate 12 has been stamped. Thereafter, an aqueous solution including a second coating material may be applied to the first layer 20 of polyelectrolyte polymer and allowed to dry to form a second coating material 22 on the first layer 20 of polyelectrolyte polymer. The substrate 12 may be a metal such as, but not limited to, stainless steel.

Figure 4:
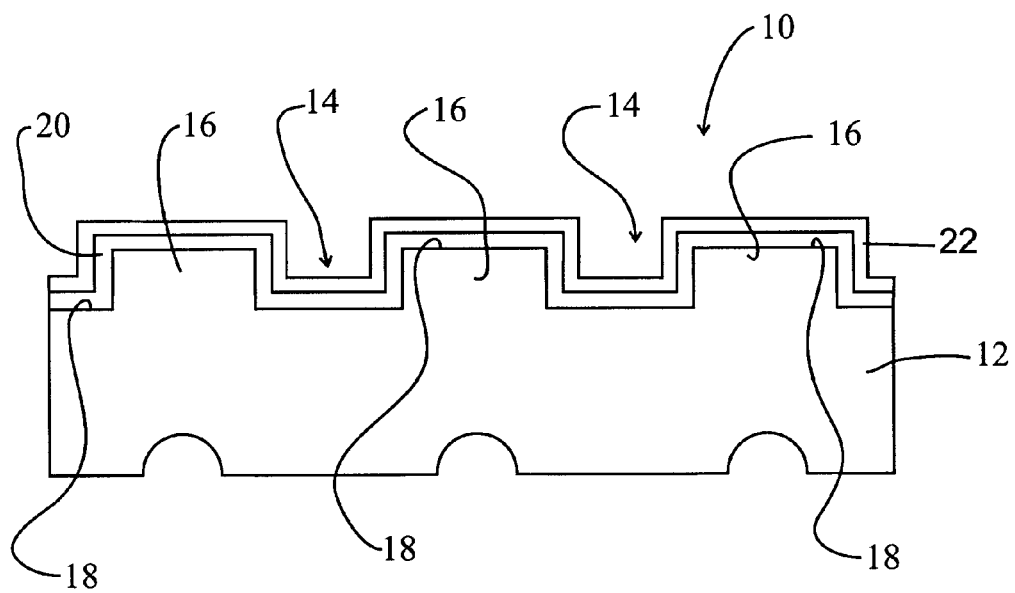
FIG. 4 illustrates a fuel component having a first layer of a polyelectrolyte polymer and a second coating material thereon according to another embodiment of the invention.

Referring now to FIG. 4, another embodiment of the invention include a fuel cell bipolar plate 10 including a substrate 12 that has been machined to define a gas flow field defined by a plurality of lands 16 and channels 14 (through which the gases flow). The aqueous solution including a polyelectrolyte polymer may be deposited over an upper surface 18 of the bipolar plate so that at least a portion of the polyelectrolyte polymer adheres to the substrate 12 to form a first layer 20. Thereafter, an aqueous solution including a second coating material may be applied to the first layer 20 of polyelectrolyte polymer and allowed to dry to form a second coating material 22 on the first layer 20 of polyelectrolyte polymer. The substrate 12 may be a metal such as, but not limited to, stainless steel.

Figure 5:
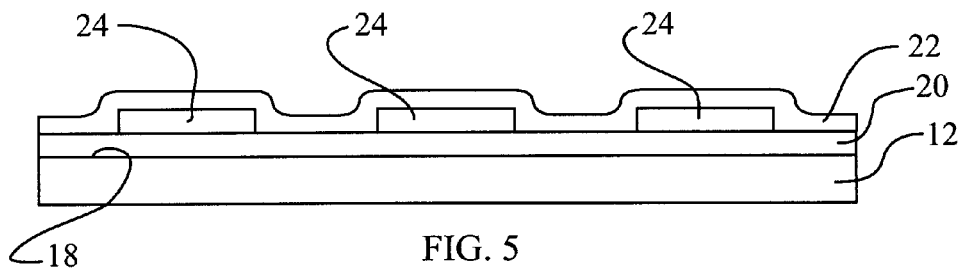
FIG. 5 illustrates a process according to one embodiment of the invention.
Figure 6:
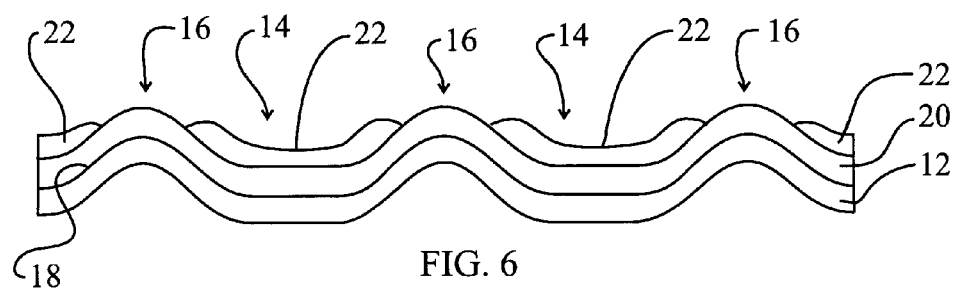
FIG. 6 illustrates a process according to another embodiment of the invention.

Referring now to FIG. 5, in one embodiment the substrate 12 may be coated with a first layer 20 of a polyelectrolyte polymer, and a masking material 24 may be selective deposited over the first layer 20. Thereafter, a second coating material 22 may be deposited over the first layer 20 and the masking material 24. As shown in FIG. 6, the masking material 24 and the second coating material directly over the masking material 24 may be removed to leave selective portion of second coating material 22 on the first layer 20. The substrate 12 may be stamped so that the second coating material 22 is in the channels 14 of a gas flow field. The aqueous solution including the polyelelctrolyte polymer, and the aqueous solution including the second coating material, may each be applied or deposited on the substrate 12 by dipping, spraying, rolling, brushing or the like.

Figure 7:
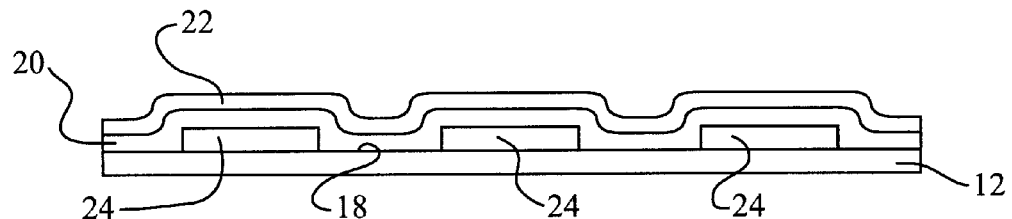
FIG. 7 illustrates a process according to another embodiment of the invention.
Figure 8:
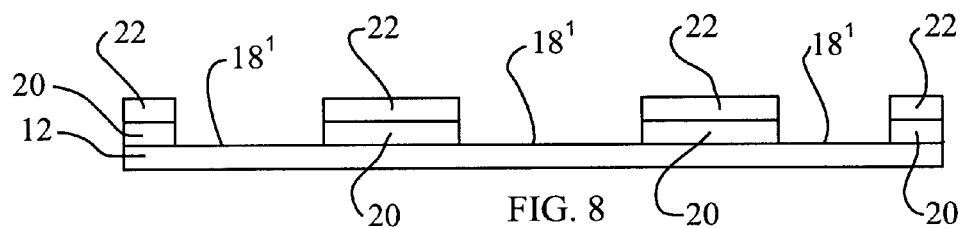
FIG. 8 illustrates a process according to another embodiment of the invention.

Referring now to FIGS. 7 and 8, in another embodiment, a masking material 24 may be selectively deposited over the upper surface 18 of the substrate 12. A first layer 20 including a polyelectrolyte polymer may be formed over the masking material 24 and the exposed portions 18' of the upper surface of the substrate 12. Then a second coating material 22 may be formed over the first layer 20. Thereafter, the masking material 24 and the portion of the first layer 20 and second coating material 22 directly over the masking material 24 may be removed as shown in FIG. 8. Similar masking techniques may be used for machined substrates.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process comprising:
   providing a bipolar plate having a surface that delineates a plurality of lands and channels which define a gas flow field;
   applying an aqueous solution comprising a polyelectrolyte polymer having cationic functional groups to the surface of the bipolar plate to form a polyelectrolyte polymer layer on at least a portion of the surface;
   applying a hydrophilic second coating having anionic functional groups to the polyelectrolyte polymer layer so that an ionic bond is formed between the cationic functional groups in the polyelectrolyte polymer layer and the anionic functional groups in the hydrophilic second coating, wherein the second coating is derived from a material having the formula:

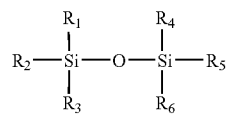

wherein $R_1$, $R_2$, $R_3$, $R_4$, $R_5$, and $R_6$, each may be H, Cl, or a saturated or unsaturated carbon chain having 1 to 4 carbon atoms, and wherein $R_1$, $R_2$, $R_3$, $R_4$, $R_5$, and $R_6$, may be the same or different, and at least one of $R_1$, $R_2$, $R_3$, $R_4$, $R_5$, or $R_6$ is a carbon chain with at least one carbon atom.

\* \* \* \* \*